United States Patent
Grant et al.

[11] 3,931,611
[45] Jan. 6, 1976

[54] PROGRAM EVENT RECORDER AND DATA PROCESSING SYSTEM

[75] Inventors: Glenn D. Grant, San Jose; David E. Chambers, Cupertino, both of Calif.

[73] Assignee: Amdahl Corporation, Sunnyvale, Calif.

[22] Filed: Dec. 10, 1973

[21] Appl. No.: 423,111

[52] U.S. Cl. .............................................. 340/172.5
[51] Int. Cl. ............................................. G06f 11/00
[58] Field of Search ..................... 444/1; 340/172.5

[56] References Cited
UNITED STATES PATENTS

| | | | |
|---|---|---|---|
| 3,264,615 | 8/1966 | Case et al. .................. | 340/172.5 |
| 3,340,539 | 9/1967 | Sims, Jr. ..................... | 340/172.5 X |
| 3,573,855 | 4/1971 | Cragon et al. ............... | 340/172.5 |
| 3,585,606 | 6/1971 | Evans et al. ................. | 340/172.5 |
| 3,742,458 | 6/1973 | Inoue et al. .................. | 340/172.5 |

*Primary Examiner*—Malcolm A. Morrison
*Assistant Examiner*—Jerry Smith
*Attorney, Agent, or Firm*—Flehr, Hohbach, Test, Albritton & Herbert

[57] ABSTRACT

Disclosed is a method and apparatus for program event recording in a data processing system and is used, for example, in debugging programs. A program event occurs whenever an address in the data processing system falls within a range between a control lower address (DTCL) and a control upper address (DTCU). The system detects a program event without degrading system performance using carry-lookahead adder structures which implement four inequality relationships.

13 Claims, 7 Drawing Figures

PROGRAM EVENT RECORDER AND DATA PROCESSING SYSTEM

CROSS REFERENCE TO RELATED APPLICATION

1. DATA PROCESSING SYSTEM, HAVING AN INSTRUCTION PIPELINE FOR CONCURRENTLY PROCESSING A PLURALITY OF INSTRUCTIONS Ser. No. 302,221, filed Oct. 30, 1972, now U.S. Pat. No. 3,840,861, invented by Gene M. Amdahl, Glenn D. Grant and Robert M. Maier, and assigned to Amdahl Corporation.

BACKGROUND OF THE INVENTION

The present invention relates to the field of instruction-controlled digital computers and specifically to program event recording in high-speed data processing systems. Instruction-controlled digital computers operate upon data to carry out desired data manipulations. A group of instructions form a program. The program normally has its instructions sequentially executed, one or more at a time, to carry out a complete data manipulation. In fetching and storing information during the operation of the data processing system, programs and control circuitry operating in the system make reference to system storage using storage addresses.

To completely specify a storage access, the number($L'$) of contiguous bytes to be fetched or stored is given as well as the lowest address, that is the system address or effective address (E), of the bytes being accessed. If L is defined to be equal to the number of bytes being accessed minus one ($L'-1$), then the address of the highest byte being referenced on one access is the sum, E+L. The address of this highest byte is known as the upper address(UA). The effective address E and the upper address UA define the address operation range.

Frequently it is desired to monitor the data processing system and to determine when the system has a storage access which falls within a range of addresses specified by a lower bound and an upper bound called the program event range(PER range). For example, when debugging programs, programmers find it particularly useful to determine when an access to storage falls between the programmer-specified upper and lower limits.

Prior art program event recording has generally required a degrading of system performance whenever it is in operation. The degrading of system performance, of course, is undesirable. There is a need, therefore, for economical program event recorders which reduce or eliminate the degrading of system performance.

SUMMARY OF THE INVENTION

The present invention is a program event recorder for use in a data processing system for detecting when the actual addresses of a reference to system storage falls between a range between a lower limit(DTCL) and an upper limit(DTCU). The program event recorder for making the determination of whether the actual address is between an upper and lower limit is carried out using a carry-lookahead adder. The carry-lookahead adder is arranged using positive and negative carries so that carries are propagated through only one level of logic per byte of data, thereby providing a high-speed comparison.

In one preferred embodiment, the high-speed data processing system operates with one storage access initiation per cycle with two cycles required to complete a storage access. The method for carrying out the accessing includes the use of a lower storage address(E) and a length($L'$) of contiguous storage addresses to be accessed. The system storage thus addressed causes an access of data and determines the existence of a program event record, status of PER, within a minimum of two cycles.

For purposes of program event recording, it is important to note that for N bits worth of addressing, the highest possible addressable byte is $2^N-1$ and that memory is considered continuous from the highest possible address ($2^N-1$) to the lowest (zero). In such a system, one embodiment of a program event recorder includes apparatus for making determinations of the four conditions W, X, Y, and Z. Those determinations are each made using the high-speed carry-lookahead adder structure. The W condition implies that the lower limit DTCL is greater than the upper limit DTCU. This W condition indicates that both the addresses $2^N-1$ and zero are within the range of addresses given by DTCL and DTCU, that is, addresses within the PER range cross the $2^N-1$ to zero memory boundary. The X condition implies that the lower storage address E is less than or equal to the upper PER limit DTCU. The Y condition implies that the upper address (E+L) is greater than or equal to the lower PER limit DTCL. The Z condition implies that the lower storage address E is greater than the upper address (E+L). This Z condition indicates that over the range from E to E+L, the memory addresses pass from $2^N-1$ to zero.

The four conditions W, X, Y, and Z are logically combined to form a program event record(PER) determination in accordance with the following logical equation:

$$PER = [(W)v(Z)] \cdot [(X)v(Y)] \; v \; (X \cdot Y) \; v \; (W \cdot Z)$$

In accordance with the above summary, the present invention achieves the objective of providing a program event record method and apparatus which, using a high-speed carry-lookahead adder structure provides a program event record without degrading system performance.

Additional features of the invention will appear from the following description in which the preferred embodiments of the invention have been set forth in detail in conjunction with the drawings.

DETAILED DESCRIPTION

Figure 1:
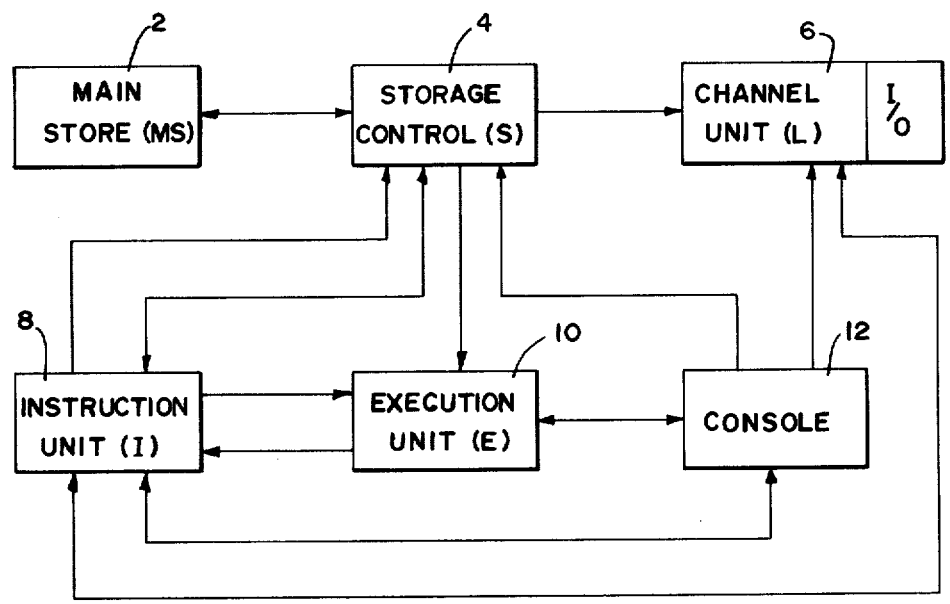
FIG. 1 depicts a block diagram of a data processing system suitable for employing the program event recorder of the present invention.

Overall System — FIG. 1

In FIG. 1, the data processing system of the present invention is shown to include a main store 2, a storage control unit 4, an instruction unit 8, an execution unit 10, a channel unit 6 with associated I/O and a console 12. The system of FIG. 1 operates under control of instructions where an organized group of instructions form a program. Instructions and the data upon which the instructions operate are introduced from the I/O equipment via the channel unit 6 through the storage control unit 4 into the main store 2. From the main store 2, instructions are fetched by the instruction unit 8 through the storage control 4 and are processed so as to control the execution within the execution unit 10.

The system of FIG. 1 is, for convenience, compatible with the IBM System/360 and the IBM/370 and accordingly, general details as to the operation of data processing systems may be had by reference to the publication: "IBM System/370 Principles of Operation", IBM Systems Reference Library, Form GA22-7000-3.

The above publications are hereby incorporated by reference into this specification for the purpose of teaching the general operation of data processing systems, for identifying nomenclature, and for defining the architectural requirements of the Systems/360 and 370.

By way of introduction, the information format in the above data processing systems organizes eight bits into a basic building block called a "byte". Each byte also typically includes a ninth bit for parity used in error detection. Although express mention of the ninth bit in each byte is not generally made throughout this specification, it is assumed that there is a parity bit associated with each byte and that the normal parity checking circuitry is included throughout the system in a well-known manner.

Two bytes are organized into a larger field defined as a half-word, and four bytes or two-half words are organized into a still larger field called a word. Two words form a double word. A word is four consecutive bytes. While these definitions are employed in the specification, it will be understood that words or bytes can equal any number of bits.

Various data formats may be employed in the environmental system so that instructions and operands may be of different length depending upon the particular operation which is to be carried out. The instruction formats include RR, RX, RS, SI, and SS. As a typical example, the RX instruction includes an 8-bit OP code, a 4-bit R1 code, a 4-bit X code, a 4-bit B2 code and a 12-bit D2 code. The OP code specifies one out of 256 instructions. The R1, X2 and B2 fields each identify one of 16 general registers. The D2 field contains a displacement number between 0 and $2^{12}-1$. As an example of the RX instruction, the AD instruction adds the contents of the register identified by the R1 field to the contents of the main storage location addressed by the sum of the number in the D2 field added to the contents of the register identified by the X2 field again added to the contents of the register identified by the B2 field. The result is placed in the register identified by the R1 field. The RX instructions require two accesses to storage for execution, one to fetch the instruction and one to fetch one of the two operands. RR instructions require one storage access while SS instructions require a minimum of three.

Figure 2:
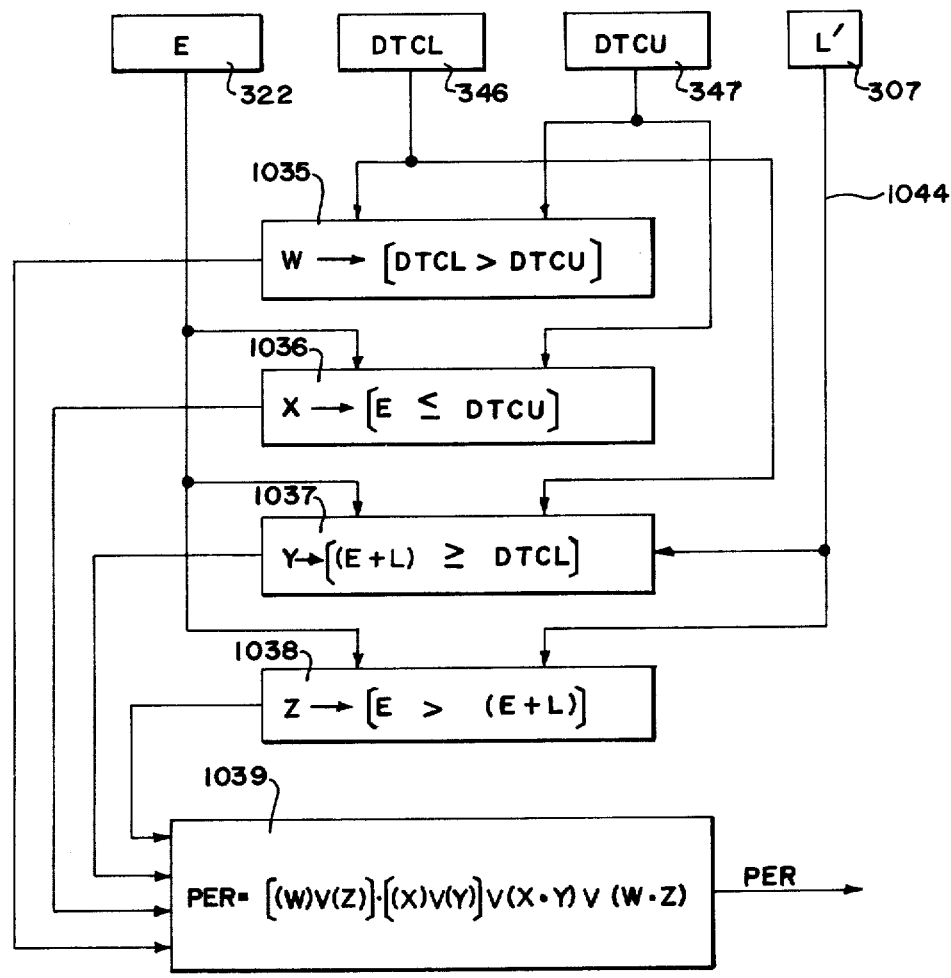
FIG. 2 depicts an overall block diagram of the program event recorder useful in the system of FIG. 1.

Program Event Recorder - FIG. 2

In FIG. 2, the program event recorder stores the lower-address(E) in a register 322 and the length(L') of contiguous addresses to be addressed in a register 307. The system of FIG. 1 uses the information in the registers 322 and 307 to access information from the storage control unit 4 which in turn fetches and stores information in the main store 2.

In order to detect when the addresses specified by the registers 322 and 307 fall within some control range, the lower limit of the control range is stored in the register 346(DTCL) and the upper limit of the range is stored in the register 347(DTCU). The effective address specified by the register 322 and the control range registers 346 and 347 have their outputs connected as inputs to high-speed carry-lookahead adder structures 1035 through 1038. The adder structure 1035 detects the W condition which indicates that the lower limit(DTCL) exceeds the upper limit(DTCU).

The adder structure 1036 detects the X condition which is that the lower address E is less than or equal to the upper limit control address(DTCU).

The adder structure 1037 and associated logic determine the Y condition that the upper address(E+L) is equal to or greater than the lower limit control address(DTCL).

The adder structure 1038 determines the Z condition which is that the lower address(E) is greater than the upper address(E+L).

The four conditions produced by the adder structures 1035 through 1038 are logically combined in the PER logic circuit 1039 which gives an indication of a program event record on its output. The program event record indicates that an address used by the system of FIG. 1 falls between the address limits specified in the registers 346 and 347.

Figure 3:
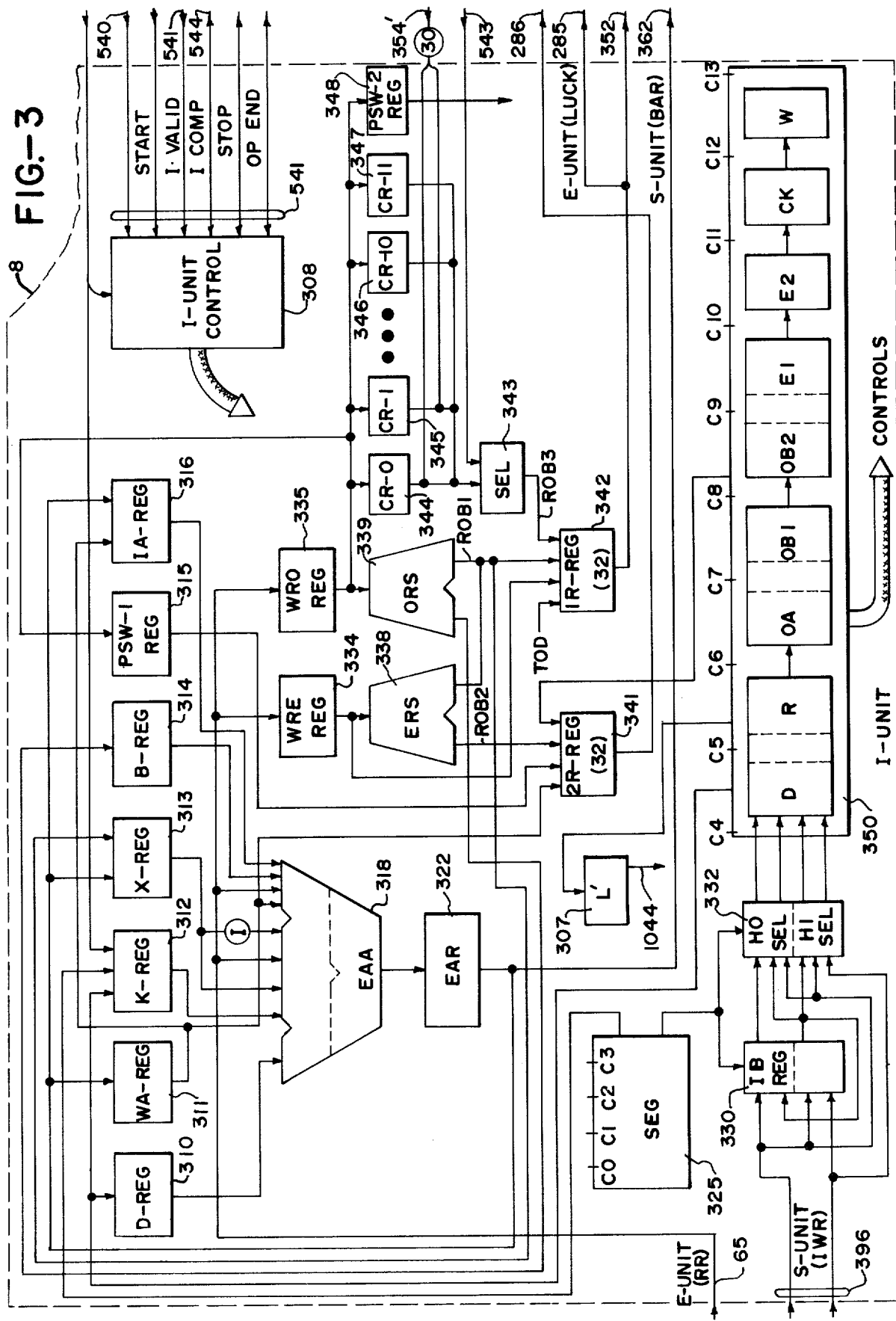
FIG. 3 depicts a schematic representation of the instruction-unit portion of the system of FIG. 1 where the program event recorder interconnects.

Instruction Unit — FIG. 3

In FIG. 3, the instruction(I) unit 8 of FIG. 1 is shown in detail. The I-unit 8 includes a plurality of addressing registers. The addressing registers include the 12-bit D register 310 for storing the displacement D1 or D2 obtained from the various instruction fields, the 24-bit WA register 312 for storing an address constant K, the 24-bit X register 313 for storing the register addressed by the X2 field of the instruction, the 24-bit B register 314 for storing the contents of the register identified by the B1 or B2 field, and a 24-bit IA register 316 for storing the instruction address. During the initial instruction fetching sequence, the IA register 316 stores bits 40 through 63 of the 64-bit PROGRAM STATUS WORD(PSW). Bits 32 through 39 of the PSW are stored in the PSW-1 register 315. Bits 0 through 31 of the PSW are stored in the PSW-2 register 348.

The addressing registers are connected with inputs to the effective address adder 318 which functions to add the contents of the selected addressing registers to form an effective address which is input to the effective address register(EAR) 322. The effective address stored in the register 322, in addition to providing inputs back into the addressing registers, is connected as an input to the storage control unit 4 and specifically, to the buffer address register (BAR) 363 (shown in FIG. 5 of the cross-referenced patent) via bus 362. From that bar register 363, the effective address addresses the high-speed buffer (HSB) 355 (shown in FIG. 5 of the cross-referenced patent) to access the desired instruction. The accessed instruction is one word in length and is stored in the IW register 388 (shown in FIG. 5 of the cross-referenced patent) from where it is gated into the instruction buffer IB register 330 or directly via the selection gates 332 into the instruction pipeline 350.

For use in generating the appropriate addresses and loading the addressing registers and for storing operands and other information the I-unit 8 includes an even register stack (ERS) 338 and an odd register stack(ORS) 339. Each of the stacks 338 and 339 includes four 32-bit scratch pad registers, and eight 32-bit general purpose registers for a total of eight scratch pad registers and sixteen general purpose registers. Additionally, the even and odd stacks 338 and 339 each include four 32-bit registers which together define four 64-bit floating point registers. The outputs from each of the registers in the stacks 338 and 339 are connected via appropriate gates to readout bus ROB1 and to readout bus ROB2. Bus ROB1 is connected as an input to the 1R register 342 and bus ROB2 is connected as an input to the 2R register 341. The 1R register 342 and the 2R register 341 have their outputs connected via buses 285 and 286 to the execution unit 10 as inputs to the LUCK 20 and the 1R register also has its output connected to the storage control unit 4 via bus 352 as an input to the store data select gates 386 (shown in FIG. 5 of the cross-referenced patent). The buses ROB1 and ROB2 from the register stacks 338 and 339 also serve as inputs to the addressing registers. In order to gate information into the registers of the stacks 338 and 339, the result register RR in the execution unit 10 connects as an input to the write even WRE register 334 and the write odd WRO register 335, which connect as inputs to the even register stack 338 and the odd register stack 339, respectively. Additionally, the write odd register 335 has its output connected as an input to the control registers 344 through 348.

The output from the control registers 344 through 348 pass through selection gates 343 the output of which is the readout bus ROB3 which in turn is connected as an input to the 1R register 342. The registers 344 through 348 provide a means whereby the control functions generally derived from the pipeline 350 insert their control conditions into the data stream of the data processing system.

The instruction fetch and the instruction presentation portions of the instruction sequence are segments PFO, IA, IB1 and IB2. The initial sequence processing is carried out under the control of the sequencer 325 in FIG. 3. The sequencer 325 controls the sequential instruction fetching and determines the next sequential instruction. After the prefetch offset(PFO), the sequential instruction fetching processing of sequencer 325 is in one of four states, the IA state, the IB1 state, the interlock state, or the wait state. The states are determined by logical determinations responsive to priority and other control signals in the data processing system.

Figure 5:
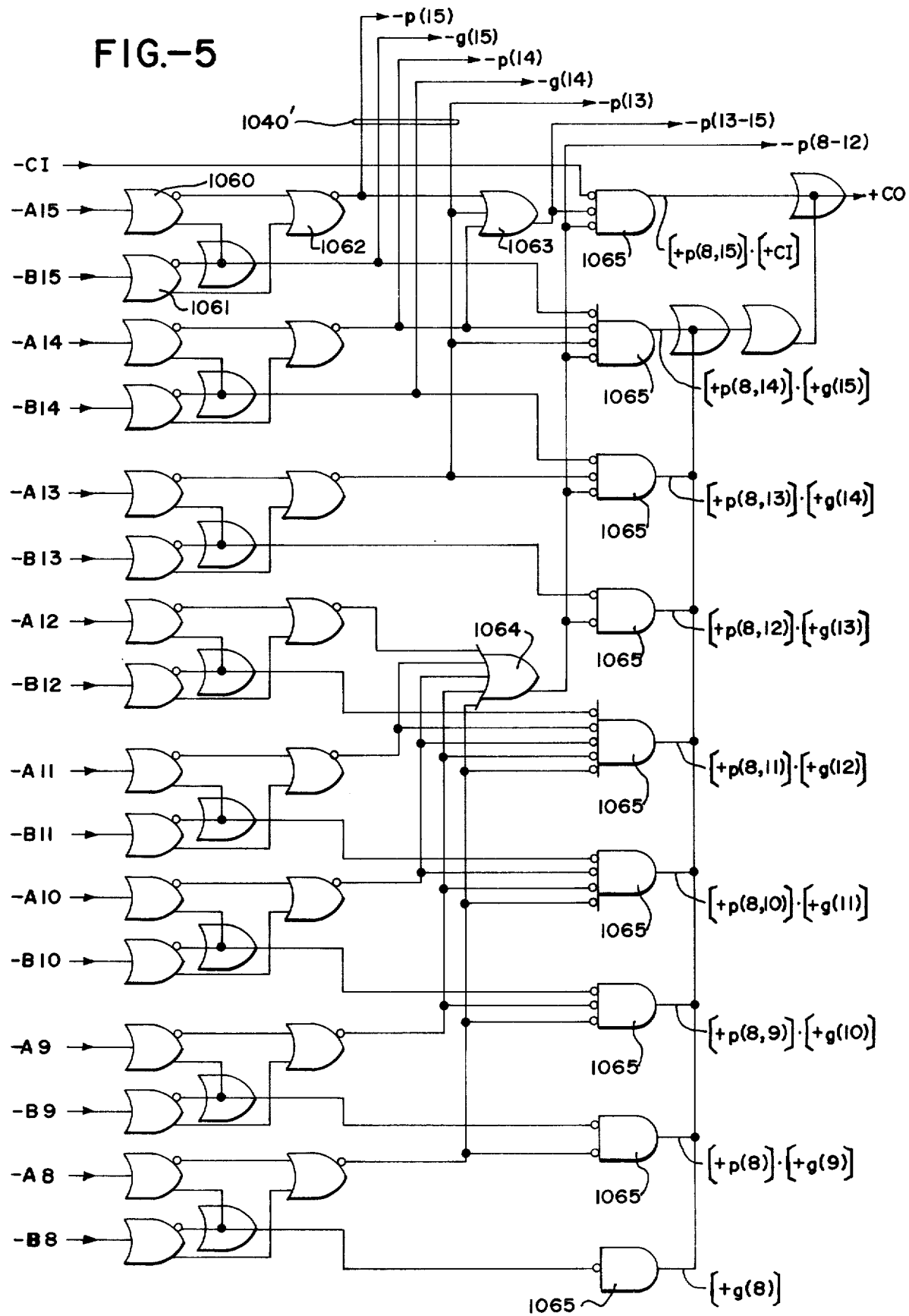
FIG. 5 depicts a schematic representation of one representative carry-lookahead adder which employs positive-true logic for generating positive carries.

The next sequential instruction selection is carried out by the sequencer 325 to select whether the next instruction inserted into the pipeline 350 is obtained from the instruction word IW register 388, from the S-unit of FIG. 5, or whether the next instruction is derived from the instruction buffer IB register 330. The determination by sequencer 325 of which instruction is the next to be gated into the pipeline 350 is responsive to various control signals generated throughout the data processing system.

The target fetch(TF) determines which instruction is to be gated into the IW or IB registers as a candidate for the next instruction to be gated into the instruction pipeline 350. The target fetch is responsive to various control signals generated throughout the data processing system.

The logic circuitry for controlling the states in sequencer 325 are implemented using standard data processing techniques. For example, the sequencer is typically a serial counter which determines that instructions are fetched in a sequential counting order until the ordered sequence is interrupted, for example, by a branch instruction. Such techniques are well known in the data processing field.

The initial segments PFO, IA, IB1, IB2 of the instruction sequence are processed under control of the sequencer 325 in FIG. 3. Sequencer 325 operates over the cycles C0, C1, C2 and C3. The prefetch offset segment PFO is carried out during time C0 to C1 which is one clock period and one cycle of the data processing system. During the PFO segment, a number to be added to the contents of the IA register 316 is loaded into the K register 312 and latched at time C1.

During the address formation, IA segment, the registers 310 through 316 are appropriately gated into the effective address adder EAA 318 which adds up to three inputs to form an effective address which is gated into the effective address register EAR 322 where that address is latched at time C2. During the instruction buffering segment IB1, the effective address from register 322 is gated via bus 362 to the buffer address register BAR 363 which is in the S-unit of FIG. 5. The register 363 is latched at time C3. The latching of data at time C3 is effective to address the high-speed buffer(HSB) 355. During the buffering segment IB2 the addressed information is accessed from the buffer 355 and is latched in the instruction word IW register 388 at time C4.

At time C4, the data is introduced into the pipeline 350. Pipeline 350 includes the register and control stages 301, 302, 303, 304, 305 and 306. The stages 301, 302 and 303 each are active for two segments. Those stages each store pipeline information and generate control signals during two cycles of time C11. The information latched in the register of stage 304 is employed for the period from C11 to C12 to generate control signals to perform the check segment of the instruction sequence. At clock pulse C12, the stage 304 information segment becomes latched in the register of stage 305. Finally, information in the register of the stage 305 is used during the W segment, during the period from C12 to C13 to generate control signals for writing information. Thereafter, the information in the pipeline 350 is discarded and is no longer retained.

Figure 4:
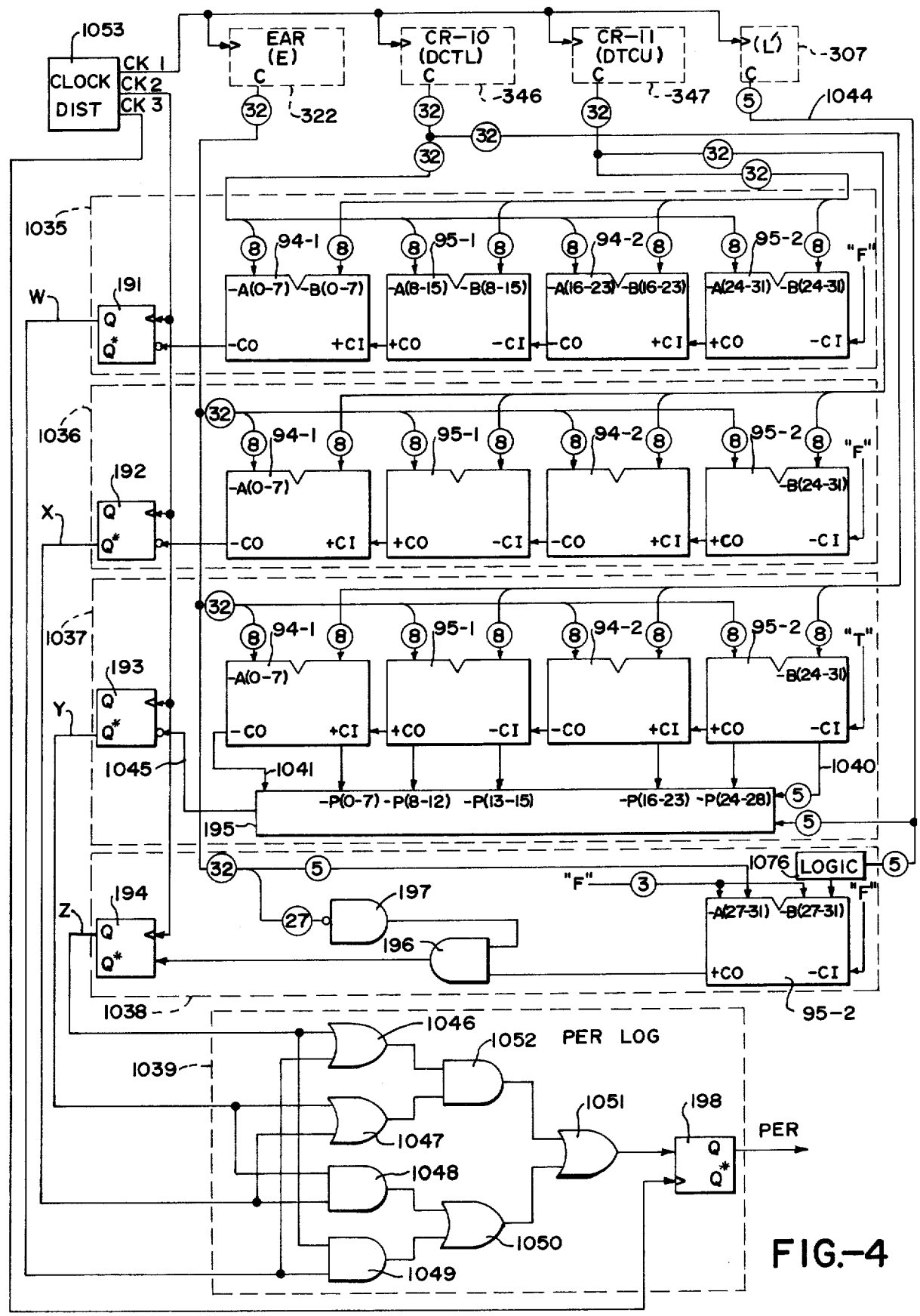
FIG. 4 depicts a detailed schematic block diagram of the program event recorder of FIG. 2.

Program Event Recorder — FIG. 4

In FIG. 4, the program event recorder is shown in further detail. The register for storing the lower address E is the effective address register 322 in FIG. 3. The register for storing the lower limit control address(DTCL) is the control register(CR-10) 346 in FIG. 3. The register for storing the upper limit control address(DTCU) is the control register(CR-11) 347 in FIG. 3. The register for storing the length field(L') is register 307 in FIG. 3. The length register is loaded by the I unit sequencer 350 prior to the time or concurrently with the loading of the EAR register 322. Each of the registers 322, 346 and 347 is 32 bits. Register 307 is 5 bits, however, in one preferred embodiment only three bits are active since address accesses at any one time are limited to eight bytes.

Each of the registers 322, 346, 347 and 307 has provision for a complement(C) output. For a logical 1 in any register bit position, the C output of that bit is a logical 0. The inversion is employed since the adders in a preferred embodiment require an inversion. To operate on a quantity +A, the adders require an input of −A.

Registers 322, 346, 347 and 307 are indicated as storing information at clock time(CK1). In actuality, in the system of FIG. 4 some of those registers actually receive their information prior to CK1 time. For simplicity, however, they are shown to be latched at CK1 time since, for the present invention, this is the time by which the data must be latched.

The output from the registers are input to the four condition circuits 1035, 1036, 1037 and 1038. These condition circuits are identical in number and function to the ones previously described in conjunction with FIG. 2.

In FIG. 4, the W condition circuit 1035 includes four eight-bit adders. The four adders include two adders 94-1 and 94-2 which employ negative-true logic and two adders 95-1 and 95-2 which employ positive-true logic. Each of the adders has an 8-bit A input port on the left-hand side and a 8-bit B input port on the right-hand side. For example, the adder 94-1 receives at its A port the eight negative inputs −A0, −A1, ..., −A7 which are designated as −A(0-7). Similarly, the adder 94-1 receives, at its B port, eight inputs −B(0-7).

The adder 94-1 has a carryout which propagates the signal −CO. Similarly, the adder 94-1 has a carryin which receives the signal +CI. The adder is 94-1 receives a positive carryin, +CI, and operates to provide a negative carryout, −CO. The meaning of positive and negative as used in connection with the carryin and carryout signals is as follows. A logical true condition(T) is represented by a high-signal level(1) for a positive carryin, +CI, and is represented by a low-signal level(0) for a negative carryin. The same rules apply for a positive carryout, +CO, where a high signal is a logical true and a low signal is a logical false and apply for a negative carryout, −CO, where a high signal is a logical false and a low signal is a logical true. The adders 94-1 and 94-2, which employ negative-true logic, receive positive carryins, +CI, and provide negative carryouts, −CO. The adders 95-1 and 95-2, which employ positive-true logic, receive negative carryins, −CI, and produce positive carryouts, +CO.

The +CO carryout from the stage 95-2 is, of course, the +CI carryin to the stage 94-2. Similarly, the −CO carryout from stage 94-2 is the −CI carryin to the stage 95-1 and the +CO carryout from the stage 95-1 is the +CI carryin to the stage 94-1. The −CO carryout from the stage 94-1 serves as the input to the latch circuit 191. The −CO carryout from stage 94-1 is inverted on the input to latch 191 and therefore, the W condition stored by latch 191 on its Q output is in positive-true form. Latch 191 is any well-known latch having, for example, a Q output which is employed and a complemented output Q* which is not employed in the present instance. Latch 191 is latched at clock time CK2 established by the clock distribution circuit 1053.

The A inputs to the adders in the condition circuit 1035 are derived from the CR-10 register 346 which stores the lower limit address DTCL of the PER range. The output is derived from the complement(C) output. The complement is employed since the adders, such as adder 94-1, of the condition circuit 1035 require negative inputs(−A) in order to perform positive logic since those adders have an inherent inversion.

The high-order eight bits from register 346 are input to adder 94-1 as bits −A(0-7). The next eight bits from high-order to low-order are input to the stage 95-1 as bits −A(8-15). The next eight bits in order from register 346 are input to stage 94-2 as bits −A(16-23). Finally, the low-order eight bits are input to the stage 95-2 as bits −A(24-31). In this manner, the 32-bits representing the quantity +A which is the address DTCL are input in the form of −A to the A ports of the adders in the condition circuit of 1035. Ignoring the inversions inherent in the adders 94 and 95, the value +A of DTCL in register 346 operated upon in the condition circuit 1035 is the true value and the inversions necessary for the actual implementation can be ignored.

The inputs to the B ports of the adders in the condition circuit 1035 is the complemented value −B derived from the +B value of the upper address DTCU stored in register 347. Again the inversion is necessary because of the adder operation. The operation of the byte adders, for example adder 94-1, in the condition circuit 1035 is to form the sum A−B using the inputs −A(0-7) plus −B(0-7). A true carryout condition, that is −CO=0, is provided if A is greater than B and the carryin is false, that is, +CI=0. If the carryin is false and if A is not greater than B, then the carryout is false. If the carryin is true, then the adders of the condition circuit 1035 provide a true carryout if A is greater than or equal to B and provide a false carryout if B is greater than A. The operation of each byte adder is summarized in the following CHART I:

CHART I

| CI | A − B | CO |
|---|---|---|
| FALSE | A > B | TRUE |
| FALSE | A ≤ B | FALSE |
| TRUE | A ≥ B | TRUE |
| TRUE | A < B | FALSE |

While each of the adders 94-1, 95-1, 94-2 and 95-2 operates in the manner indicated in CHART I on 8-bit bytes, the four adders together, with carryouts connected to carryins as indicated, operate on 32-bits. The carryin of the lowest-order stage 95-2 is chosen to be false(F) so that the four adders together perform the function of detecting whether A is greater than B. As previously indicated, the value of A is DCTL and the value of B is DTCU and they are latched in registers 346 and 347, respectively, at least by CK1 time. At CK2 time, latch 191 has its Q output set to 1 if DCTL is greater than DTCU or set to 0 if DCTL is not greater than DTCU.

The X condition circuitry 1036 includes the byte adders 94-1, 95-1, 94-2 and 95-2 which are identical to the adders in condition circuitry 1035. The A ports receive the value of E from the effective address register 322. The B ports receive the value of DTCU from the register 347. Since the carryin to stage 95-2 is always false(F), the carryout from stage 94-1 is true if E is greater than DTCU and is false if E is less than or equal to DTCU. The carryout from stage 94-1 is inverted and stored in the latch 192. The X condition, however, is taken as the complement Q* output of latch 192. Accordingly, X and the Q* output is a 1 if E is less than or equal to DTCU and is a 0 if E is greater than DTCU.

The Y condition circuit 1037 is again identical to the circuits 1035 and 1036 for the W and X conditions. Additionally, the Y condition circuit 1037 includes length logic 195 in addition to the latch 193 and the byte adders 94-1, 95-1, 94-2 and 95-2.

In circuit 1037, the byte adders receive the effective address E from register 322 and receive on the B ports the value of DCTL from register 346. The adder 95-2 in the Y condition circuit 1037 receives as its carryin a true(T) input. Therefore, in accordance with the rules in the above-identified CHART I, the carryout from the byte adder 94-1 is true if E is greater than or equal to DCTL and is false if E is less than DCTL. That carryout from stage 94-1 is input to the length logic 195.

Figure 7:
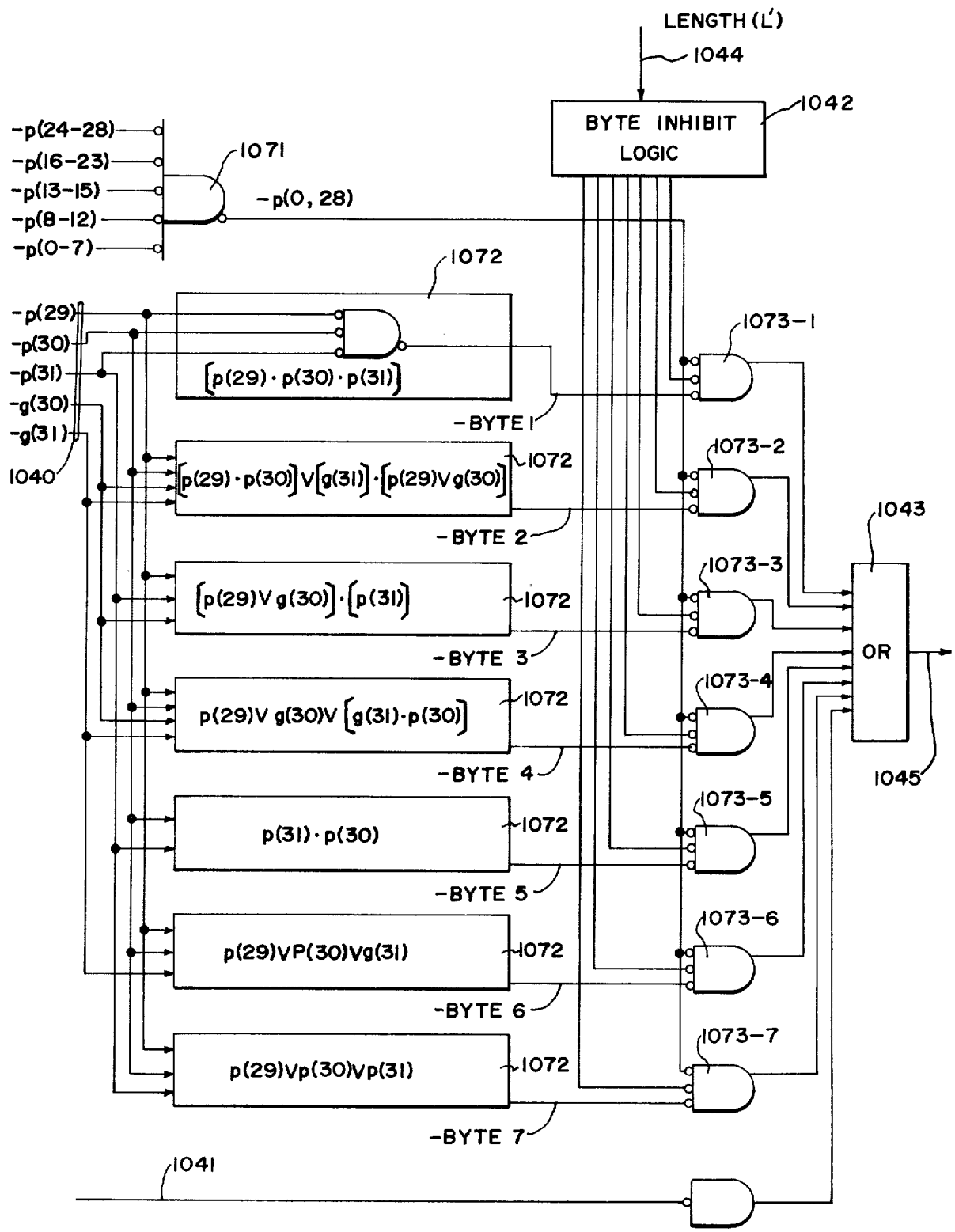
FIG. 7 depicts a schematic representation of the L logic which is used within the Y condition detector of FIG. 4.

The length logic 195 in FIG. 4 also includes the propagate input −p(0-7) from adder 94-1, the propagate inputs −p(8-12) and −p(13-15) from adder 95-1, the inputs −p(16-23) from adder 94-2, and the input −p(24-28) from adder 95-2. Additionally, adder 95-2 provides five additional propagate and generate signals on bus 1040. Length circuit 195 also receives the length L′ from the register 307 on bus 1044. The length logic 195 provides an output through an inverting input to latch 193. The Q* output from latch 193 is the Y condition. The function of the length logic 195 is to determine if any address between E and E+L is greater than or equal to the lower PER address DTCL. The details of the logic 195 are shown in FIG. 7.

The Z condition circuit 1038 includes one byte adder 95-2 which is like the same-numbered byte adders in the W, X and Y condition circuits. In circuit 1038, the adder 95-2 receives, on its A port, the complement of the five low-order bits (27-31) of the effective address E in register 322 and, on its B port, the true value of the five bits of L through logic 1076. Logic 1076 functions in a conventional manner to receive the complement of L′ from register 307, invert it to the true value of L′, and subtract +1 to form the true value of L. Since the adder 95-2 receives the low-order 5-bit complement of E and the true value of L it performs the addition E+L for those five bits. The other 27 high-order address bits of E are input to a 27-way NAND gate 197. Gate 197 performs the function of determining when all high-order twenty-seven bits of E are 1's. When that condition is met, AND gate 196 is enabled. Gate 196 has its other input derived from the carryout of adder 95-2. Since the carryin to adder 95-2 is false(F), adder 95-2 functions to provide a true carryout if the five low-order bits of E summed with the five bits of L are greater than $2^5-1$ and to provide a false carryout if the low-order bits of E summed with L are less than or equal to $2^5-1$. This use of the adder 95-2 in combination with the other circuits determines $E+L>2^N-1$ which is the same as determining E>E+L when the 27 high-order bits of E are true.

Under the conditions of a true output from adder 95-2, gate 196 becomes satisfied, when enabled by gate 197 (as occurs when the 27 high-order bits of E are true), and stores its value in latch 194. The Z condition appears as the Q output from latch 194.

Each of the latches 191 through 194 is set by the clock distribution circuit 1053 at CK2 time. At CK2 time, the W, X, Y and Z conditions are input to the PER logic 1039.

The PER logic 1039 includes an OR gate 1046 for OR'ing the Z and W conditions, an OR gate 1047 for OR'ing the X and Y conditions, an AND gate 1048 for AND'ing the X and Y conditions, and an AND gate 1049 for AND'ing the W and Z conditions. The outputs from gates 1046 and 1047 are further combined in the AND gate 1052 to provide an input to OR gate 1051. Similarly, the outputs from gates 1048 and 1049 are combined in OR gate 1050 which in turn provides the second input to OR gate 1051. The output from gate 1051 is in turn input to the latch 198 where it is stored as the PER condition. The PER condition appears on the Q output of latch 198. Latch 198 is latched at CK3 time. The logical function performed by the PER logic is given by the following equation:

PER = [(W)v(Z)] · [(X)v(Y)] v (X · Y) v (W · Z)

Positive-True Byte Adder — FIG. 5

The positive-true byte adder of FIG. 5 is typical of the byte adders 95-1 in FIG. 4. Also, the adder of FIG. 5 is typical of the adders 95-2 in FIG. 4 if the quantity 16 is added to all the propagate, generate and bit numbers in FIG. 5. For example, the input bits −A8 through −A15 for the adders 95-1 become the bits −A24 through −A31 after an addition of 16.

The function of the adder of FIG. 5 is to generate a true carryout, +CO equal to 1, whenever the quantity +A is greater than +B. In making that determination, however, the adder of FIG. 5 receives −A and −B inputs as indicated. The operations performed on bit 15 are typical. For bit 15 −A15 and −B15 are input to the phase-splitting gates 1060 and 1061, respectively. The dot-OR of the non-inverting output from gate 1060 and the inverting output of gate 1061 provide the negative 1's generate term −g(15). The inverting output of gate 1060 and the non-inverting output of gate 1061 are combined in the gate 1062 to provide on its inverting output the negative 1's propagate term −p(15). In a similar manner, each of the other bits 8 through 14 have negative propagate and generate terms formed.

The propagate and generate lines −p(15), −g(15), −p(14), −g(14) and −p(13) form the 5-bit bus 1040′. The bus 1040′ is not explicitly used. However, by adding a quantity 16 to each of those terms for a corresponding circuit 95-2, the terms −p(31), −g(31), −p(30), −g(30) and −p(29) are formed and constitute the bus 1040 output from the adder 95-2 in the Y condition circuit 1037 of FIG. 4.

In FIG. 5, certain of the negative propagate terms are OR'ed. Specifically, OR gate 1063 receives as inputs the terms −p(13), −p(14), and −p(15) and OR's those terms to form the term −p(13-15) which is equal to [−p(13)] v [−p(14)] v [p(15)]. The symbol "v" is the logical OR symbol.

The OR gate 1064 also receives five input propagate terms for bits 8 through 12 and forms the output −p(8-12). The propagate and generate terms thus produced are then collected in nine NOR gates 1065 which function to invert the negative generate and propagate terms to positive generate and propagate terms. The outputs from the nine NOR gates 1065 are OR'ed to form the +CO term. Each of the nine gates 1065 essentially is one of nine ways in which a positive carryout can be generated. It should be noted that the negative carryin, —CI, only passes through one logic gate in influencing the carryout term. The carryout term, +CO, is given by the following equation:

+CO = [+g(8)]
v [+g(9)] · [+p(8)]
v [+g(10)] · [+p(8,9)]
v [+g(11)] · [+p(8,10)]
v [+g(12)] · [+p(8,11)]
v [+g(13)] · [+p(8,12)]
v [+g(14)] · [+p(8,13)]
v [+g(15)] · [+p(8,14)]
v [+CI] · [+p(8,15)]

In the above equation, the nine terms correspond to nine outputs from the gates 1065. The dot "." symbol is the logical AND symbol. The symbol +p(8,10) is equal to [+p(8)]·[+p(9)]·[+p(10)].

The positive propagate, +p(i), and the positive generate +g(i), are 1's propagate and generate terms. For any two typical bits +A(i) and +B(i) in forming the sum [+A(i)] − [+B(i)], a logical 1 is produced as the 1's propagate, +p(i), if +A(i) is 1 or +B(i) is 0. A 1 is produced for the 1's generate, +g(i), if +A(i) is 1 and +B(i) is 0.

Figure 6:
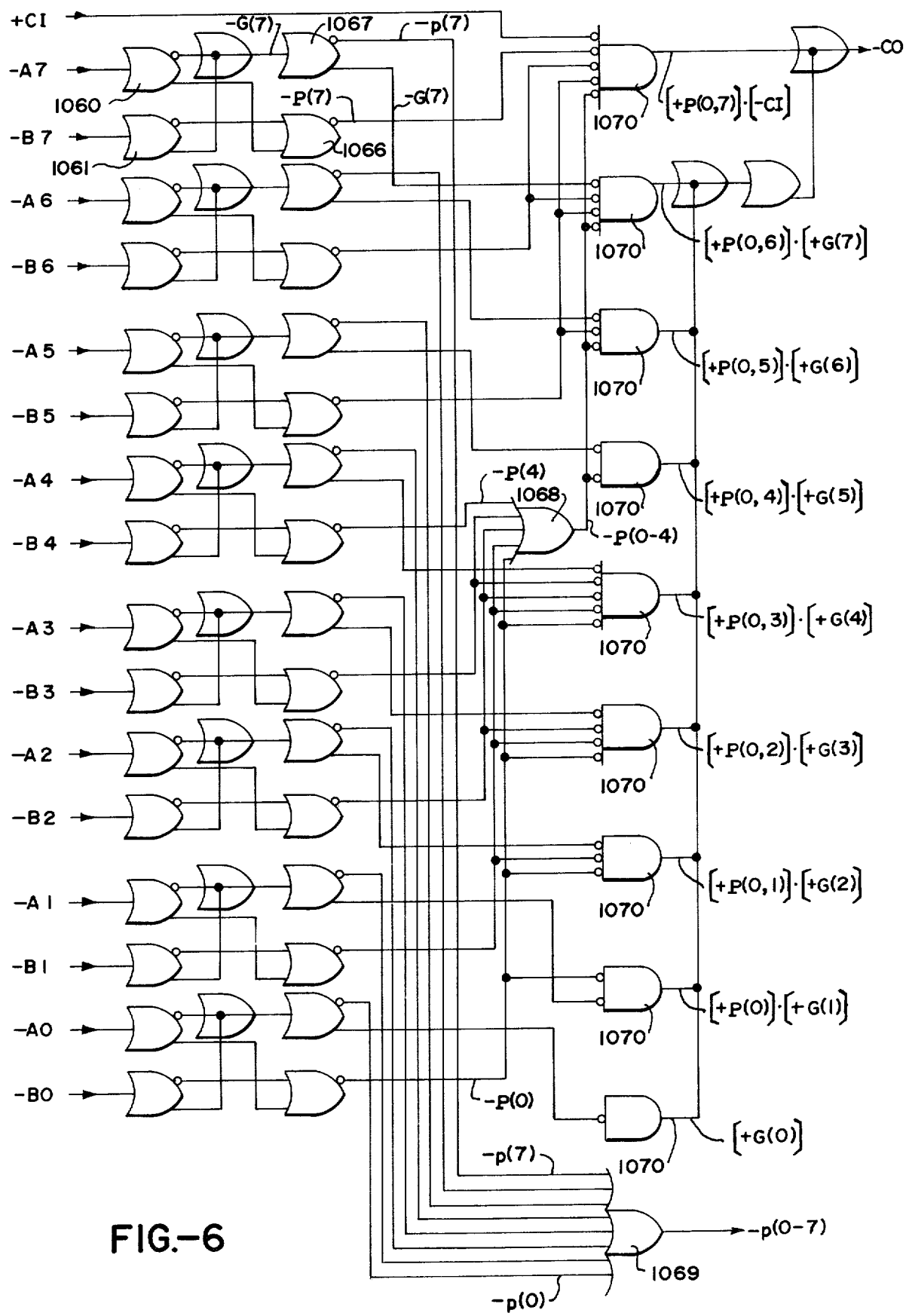
FIG. 6 depicts a schematic representation of a portion of the carry-lookahead adder structure which is complementary to the FIG. 5 structure and which uses negative-true logic to generate negative carries.

Negative-True Byte Adder — FIG. 6

In FIG. 6, the byte adder shown is typical of the byte adders 94-1 in FIG. 4. Further, by addition of the quantity 16 to any of the bit, propagate and generate terms in FIG. 6, the FIG. 6 adder becomes typical of the adders 94-2 in FIG. 4. The adder of FIG. 6 operates on 0's as contrasted with the adder of FIG. 5 which operates on 1's. Specifically, for two typical bits +A(i) and +B(i) in forming [+A(i)] − [+B(i)], the zero propagate term, P(i) and the zero generate term, G(i), obey the following rules. The positive zero propagate term, +P(i), is 1 if +A(i) is 0 or +B(i) is 1. The positive zero generate term, +G(i), is 1 if +A(i) is 0 and +B(i) is 1.

In forming the positive zero propagate and generate terms, the adder of FIG. 6 initially employs the negative bit inputs, −A(i) and −B(i), because of the inversion in the FIG. 6 adder. Bit 7 (i=7) in FIG. 6 is discussed as typical. The inputs −A7 and −B7 are input to the phasesplitting gates 1060 and 1061, respectively. The non-inverting output from gate 1061 is dot-OR'ed with the inverting output of gate 1060 to form the negative zero propagate term −G(7). The non-inverting output of gate 1060 and the inverting output of gate 1061 are combined in the NOR gate 1066 to provide the negative zero propagate term −P(7). Gate 1067 is also provided for forming −B(7) and −G(7) from the −G(7) output from gates 1060 and 1061. The terms −p(0) through −p(7) are OR'ed in gate 1069 to provide the OR'ed output −p(0-7) which denotes a "1's propagate" output.

A gate 1068 is provided for collecting the negative zero propagate terms −P(0) through −P(4) to provide the OR'ed output −P(0-4). The zero propagate and generate terms are collected in nine NOR gates 1070. The outputs from the gates 1070 are OR'ed to provide the negative carryout −CO. The negative carryout, −CO, is defined by the following equation:

−CO = [+G(0)]
v [+G(1)]·[+P(0)]
v [+G(2)]· [+P(0,1)]
v [+G(3)]·[+P(0,2)]
v [+G(4)]·[+P(0,3)]
v [+G(5)]·[+P(0,4)]
v [+G(6)]·[+P(0,5)]
v [+G(7)]·[+P(0,6)]
v [ −CI ]·[+P(0,7)]

In the above equation for −CO, each of the nine terms correspond to the output from the nine gates 1070. The symbol "v" represents the logical OR and the symbol "." represents the logical AND. The term "[+P(0,2)]" represents [+P(0)]·[+P(1)]·[+P(2)].

The meaning of the −CO term is that there are nine conditions by which a 0 will be propagated. Prapagating a 0 has the same meaning as not propagating a 1.

Length Logic — FIG. 7

In FIG. 7, further details of the length logic 195 of FIG. 4 are shown. Gate 1071 receives the OR'ed propagate signals from the byte adders within the Y condition circuitry 1037 and forms the output −p(0,28) which signifies when all of the high-order bits 0 through 28 of E and DTCL are identical provided no carryout has occurred. The identity exists since, in the absence of a carryout and +p(0,28) is true, no generates can exist and therefore the propagate must derive from identity. That signal −p(0,28) is input to enable the seven NOR gates 1073. Byte inhibit logic 1042 also provides an input to each of the gates 1073. Inhibit logic 1042 is a tree decoder which decodes the input length L' on line 1044 from register 307. If the length L' indicates one byte (which means only address E is of concern, the input to gate 1073-1 is enabled. If the length is two bytes (E+1) the input to gate 1073-2 is enabled as well as the input to gate 1073-1. If the length is three bytes (E+2) then the inputs to gates 1073-3, 1073-2 and 1073-1 are enabled. The progression continues in the same measure until for L' equal to 7(E+6) all of the gates 1073-7 through 1073-1 are enabled. Each of the gates 1073 receives a third input from the byte circuits 1072. The byte circuits 1072 detect whenever the length L when added to the address E will cause the address E+L to exceed DTCL. The carryout input on line 1041 through the inverter to the OR gate 1043 serves to detect whether E by itself is greater than DTCL. If the address E by itself does not cause an output from gate 1043, then the byte circuits 1032 for signals -BYTE 2 through -BYTE 7 determine whether the length L when added to E will cause an output from the gate 1043. In the particular system of FIG. 1, the length L' is limited to eight bytes, but only seven bytes are actually used and hence only −BYTE 1, . . . , −BYTE 7 signals are generated. The −BYTE 1 signal for the Y condition is redundant and makes the same determination as the signal on line 1041.

The details of the circuit 1072 for generating the −BYTE 1 signal are shown to include a gate for forming the AND function −[+p(29)]·[+p(30)]·[+p(31)]. The meaning of the −BYTE 1 signal in combination with the signal from gate 1071 is that all propagate terms from +p(0) to +p(31) are present. This condition signifies that E is identical to DTCL if no carryout is indicated on line 1041. If L' is 1, then circuit 1042 enables gate 1073-1 and provides an output through OR gate 1043 on line 1045. The details of each of the other circuits are shown schematically in logical notation in FIG. 7. Each of those other circuits logically test whether the addition of a particular value of L' to the three low-order bits 29, 30 and 31 of E will cause E+L to equal or exceed DTCL.

SUMMARY OF OPERATION

The operation of the program event recorder of FIG. 2 in connection with storage alteration by the system of FIG. 1 is explained with reference to a specific examples. For purposes of explanation, the lower PER range address DTCL is chosen to be 001FFC30 (addresses in hexadecimal format). The upper PER range address DTCU is chosen to be 001FFC34. With this PER range, for a storage alteration PER determination the operation of the FIG. 2 circuit for an effective address of 001FFC36 and an E+L address of 001FFC39 is summarized in the following CHART II:

CHART II

| Ck1 | DTCL = 001FFC30 |
| --- | --- |
|  | DTCU = 001FFC34 |
|  | E = 001FFC36 |
|  | L' = 4 |
| CK2 | W = False(0) |
|  | X = False(0) |
|  | Y = True(1) |
|  | Z = False(0) |
| CK3 | PER = False(0) |

In the above CHART II, the indicated values of DTCL, DTCU, and E are stored in the registers 346, 347 and 322. The value of L' equal to is similarly stored in the register 307 so that the value of E+L is equal to 001FFC39. With a value of L' equal to 4, the system of FIG. 1 operates to access four bytes starting with the byte specified by the effective address E. At CK1 time, the values in CHART II are latched in the indicated registers and are input to the respective W, X, Y and Z condition circuits which operate to make determinations in the manner previously described. At CK2 time, the latches 191 through 194 in FIG. 4 are latched with the determined conditions.

With the input address information of CHART II, the W condition is false, 191Q equal to 0, since DTCL is not greater than DTCU. The X condition is false, 192Q* equal to 0, since E is greater than DTCU. The Y condition is true, 193Q* equal to 1 since E+L is greater than DTCL. The Z condition is false, 194Q* equal to O, since E is not greater than E+L. At CK2 time, the indicated values of W, X, Y and Z are input to the PER logic 1039 where the logic determines that PER is false (0). In FIG. 4, that false determination is latched into latch 198 at CK3 time rendering 198Q equal to 0.

In a second example, the lower PER range address is 001FFC35 and the upper PER range address DTCU is 001FFC38. The effective address E is 001FFC33 and the address E+L is 001FFC36 indicating that L' is 4. The operation of the circuit of FIG. 2 with the indicated input conditions is summarized in the following CHART III:

CHART III

| CK1 | DTCL = 001FFC35 |
| --- | --- |
|  | DTCU = 001FFC38 |
|  | E = 001FFC33 |
|  | L' = 4 |
| CK2 | W = False(0) |
|  | X = True(1) |
|  | Y = True(1) |
|  | Z = False(0) |
| CK3 | PER = True(1) |

In the above CHART III, the PER test is true since two bytes in the address range from E to E+L fall within the PER range between DTCL and DTCU. Specifically, those bytes are the two bytes 001FFC35 and 001FFC36. If the example of CHART II were modified so that L' were equal to 2 and all other values were the same, the PER determination would be false since no addresses would fall within the PER range.

In the example of CHART III the FIG. 7 circuitry operates in the following manner. All high-order binary bits 0 through 28 of DTCL and E are identical and, therefore, an enabling output will be generated by gate 1071. Because L' is equal to 4, all of the gates 1073-1 through 1073-4 are enabled by logic 1042. The last four bits, BITS 28, 29, 30 and 31, of E are 0011(equal to Hex 3) and of DTCL are 0101(equal to Hex 5). The term +p(28) equals 1 as is required by gate 1071. Additionally, +p(29) is 0, +p(30) is 1, +p(31) is 1, +g(30) is 1, and +g(31) is 0. The negative value of those terms appear as an input on bus 1040 in FIG. 7. With the indicated inputs, the −BYTE 1 signal from gate 1072 is not energized since the +p(29) term is 0, that is, the −p(29) term is 1. Similarly, there is no output from the −BYTE 2 circuit since +p(29) and +g(31) are both 0's. There is an output from the −BYTE 3 circuit 1072 in FIG. 7, however, since +g(30) is 1 and +p(31) is 1. The output from the −BYTE 3 circuit is input to the gate 1073-3. Gate 1073-3 is also enabled by the other two inputs from circuit 1071 and 1042 as described. Accordingly, gate 1073-3 provides an output to the OR gate 1043 indicating that the address 001FFC35 is within the PER range.

Further and Other Embodiments

The circuitry of FIG. 2 was described in connection with program event records which involved accesses to storage. An indication of whether any address over the range E to E+L fell within the PER range was made. Additionally, it is of interest in the FIG. 1 system to determine explicitly whether the present instruction or a prefetched future instruction falls within the PER range. The present instruction has the address E, the next possible prefetched instruction has the address E+2, the next possible prefetched instruction has the address E+4, and the next possible prefetched instruction has the address E+6.

In the data processing system of FIG. 1 which has the capability of fetching 8 bytes of an instruction stream on a single memory access, good system performance requires the detection of a PER event for instructions at addresses E, E+2, E+4, and E+6. The reason for interest in E, E+2, E+4, and E+6 is that, for the FIG. 1 system, an instruction may begin on any halfwood boundary. Since at the time of the instruction fetch it is not known which of the halfword boundaries is actually the start of a new instruction, the detection of whether each halfword boundary is a PER event is desirable. Thereafter, when it is finally determined which halfword boundaries actually begin new instructions, the proper PER event determination for that instruction can be reported to the system.

To make the determination explicitly for the addresses E, E+2, E+4, and E+6, the circuitry of FIG. 7 is modified and duplicated and used both in the X condition circuitry 1036 and the Y condition circuitry 1037. The circuitry of FIG. 7 is modified by both X and Y tests by eliminating the byte inhibit logic 1042 and the gates 1073.

For test Y, a determination that E itself is within the PER range is then determined by the signal of opposite polarity of the carryout signal —CO on line 1041. For test Y, a determination of whether E+2 is within the range is obtained by the OR of the opposite polarities (e.g. +BYTE 1) of the signals —BYTE 2, —BYTE 1 and —CO. For test Y, a determination of whether the address E+4 is within the range is determined by the OR of the opposite polarities of the signals —BYTE 4, —BYTE 3, —BYTE 2, —BYTE 1, and —CO. For test Y, a determination of whether the instruction address E+6 is within the range is determined by the OR of the opposite polarities of the signals —BYTE 6, —BYTE 5, ..., —BYTE 1, and —CO. These determinations are made in parallel by conventional inverters and OR gates (not shown) and stored in latch circuits (not shown) clocked at CK2 time.

For test X, a determination of whether E is less than or equal to DTCU, is made by the signal of opposite polarity of the carryout signal —CO on line 1041. For test X, a determination of whether E+2; E+4; and E+6 are each less than or equal to DTCU, the opposite polarity of the signals —BYTE 2, —BYTE 1, and —CO; of the signals —BYTE 5, —BYTE 4, ..., —BYTE 1 and —CO; and of the signals —BYTE 7, —BYTE 6, ..., —BYTE 1 and —CO, respectively, are OR'ed. These determinations are made by conventional inverters and OR gates (not shown) and the results are latched in latch circuits (not shown) at time CK2.

The latched results of the X and Y tests for the four separate address values E, E+2, E+4 and E+6 are then each input to the PER logic 1039 at different times to make four separate PER determinations, one for each separate address value.

While the embodiment of FIG. 2 was described in connection with memories having contiguous addresses accross the memory boundary from the highest address, $2^N-1$, to the lowest address, zero, the invention can be used for addresses which do not have the capability of crossing the memory boundary. If addresses never cross the memory boundary, then the W condition and the Z condition are not required. The PER logic 1039 is simplified by simply allowing the W and Z terms to be 0.

For systems where it is only desired to know whether the address E is in the PER range, then the length logic 195 in FIG. 4 can be eliminated and the —CO signal from adder 94-1 is directly input to the latch 193.

While the invention has been particularly shown and described with reference to preferred embodiments thereof it will be understood by those skilled in the art that various changes in form and details may be made therein without departing from the spirit and the scope of the invention.

What is claimed is:

1. In a data processing system having memory and address processing circuitry, the apparatus comprising,
   first means for providing a system address used in the operation of said system, second means for providing a lower address and third means for providing an upper address where said lower and said upper addresses define an address event range, fourth means for providing a length number representing the number of contiguous addresses, from said system address to a high address used in the operation of said system, said length number and said system address defining an address operation range bounded by said system address and said high address,
   first carry-lookahead adder means, connected to receive said system address and said lower address, for providing a first signal if said system address is greater than or equal to said lower address,
   second carry-lookahead adder means, connected to receive said system address and said upper address for providing a second signal if said system address is less than or equal to said upper address,
   third carry-lookahead adder means connected to receive said upper address and said lower address for providing a third signal when said lower address is greater than said upper address,
   fourth carry-lookahead adder means, connected to receive said length number and said system address for providing a fourth signal when said system address is greater than said high address,
   logic means for detecting the presence of said first, second, third and fourth signals to provide an event record when said system address is within said address event range.

2. In a data processing system having memory and address processing circuitry, the apparatus comprising,
   first means for providing a system address used in the operation of said system, second means for providing a lower address and third means for providing an upper address where said lower and said upper addresses define an address event range, fourth means for providing a length number representing the number of contiguous addresses, from said system address, used in the operation of said system, said length number and said system addresses defining an address operation range,
   first carry-lookahead adder means, connected to receive said system address and said lower address, for responsively providing propagate and carry signals and a first carryout if said system address is greater than or equal to said lower address,
   second carry-lookahead adder means, connected to receive said system address and said upper address for providing a second carryout if said system address is less than or equal to said upper address, and
   logic means including means for detecting the presence of both said first and second carryouts to provide an event record when said system address is within said address event range and including means connected to receive said propagate and carry signals from said first adder and connected to receive said length number for determining when addresses within said operation range are within said event range.

3. In a data processing system having memory and address processing circuitry, the apparatus comprising,
   first means for providing a system address used in the operation of said system, second means for providing a lower address and third means for providing an upper address where said lower and said upper addresses define an address event range, wherein said first means, said second means and said third means each includes means for latching a respective address at least by a first clock time,
   first carry-lookahead adder means, connected to receive said system address and said lower address, for providing a first carryout if said system address is greater than or equal to said lower address, and second carry-lookahead adder means, connected to receive said system address and said upper address for providing a second carryout if said system address is less than or equal to said upper address, and wherein said first carry-lookahead adder means and said second carry-lookahead adder means each includes means for latching said carryouts at a second clock time, logic means for detecting the presence of both said first and second carryouts to provide an event record when said system address is within said address event range and where said logic means includes means for latching said event record at a third clock time, said apparatus further including clock distribution means for distributing clock pulses including pulses at said first, second and third clock times for latching the addresses.

4. The apparatus of claim 3 wherein said first and said second carry-lookahead adder means each includes a first byte adder having positive-true logic and a second byte adder having negative-true logic, said byte adders each having a carryout and a carryin, said adders connected in series with the carryout from one of said byte adders connected to the carryin of the other of said byte adders.

5. The apparatus of claim 3 wherein said first, said second and said third means each includes means for storing said system address, said lower-address and said upper address as four-byte addresses, and wherein said first and second carry-lookahead adder means each includes two first-byte adders having positive-true logic and two second-byte adders having negative-true logic, said byte adders each having a carryout and a carryin, said byte adders connected in series with the carryout from one of the first-byte adders connected as a carryin to one of the second byte adders and a carryout from one of the second-byte adders connected as a carryin to one of the first-byte adders.

6. In a data processing system having memory and address processing circuitry, the apparatus comprising, first means for storing a system address used in the operation of said system, second means for storing a lower address and third means for storing an upper address where said lower and said upper addresses define an address event range, fourth means for storing a length number representing the number of contiguous addresses, from said system address to a high address used in the operation of said system, said length number and said system address defining an address operation range bounded by said system address and said high address, first carry-lookahead adder means, connected to receive said system address and said lower address, for providing propagate and generate signals and providing a first carryout signal if said system address is greater than or equal to said lower address and including length logic means connected to receive said propagate, generate and carryout signals and connected to receive said length number for establishing a condition Y when addresses within said operation range are within said event range, second carry-lookahead adder means, connected to receive said system address and said upper address, for providing a second carryout and establishing a condition X if said system address is less than or equal to said upper address, third carry-lookahead adder means, connected to receive said upper address and said lower address, to establish a condition W when said lower address is greater than said upper address, fourth carry-lookahead adder means, connected to receive said length number and said system address, to establish a condition Z when said system address is greater than said high address, and means for detecting the presence of said conditions W, X, Y, and Z to provide an event record PER when said system address is within said address event range in accordance with the equation:

PER = [(W)v(Z)]·[(X)v(Y)] v (X·Y) v (W·Z)

7. The apparatus of claim 6 wherein said first, said second, and said third carry-lookahead adder means each includes a first byte adder having positive-true logic and a second byte adder having negative-true logic, said byte adders each having a carryout and a carryin, said adders connected in series with the carryout from one of said byte adders connected to the carryin of the other of said byte adders.

8. The apparatus of claim 6 wherein said first, said second, and said third carry-lookahead adder means each includes two first-byte adders having positive-true logic and two second-byte adders having negative-true logic, said byte adders each having a carryout and a carryin, said byte adders for each of said carry-lookahead adder means connected in series with the carryout from one of the first byte adders connected as a carryin to one of the second-byte adders and a carryout from one of the second-byte adders connected as a carryin to one of the first-byte adders.

9. The apparatus of claim 6 wherein said fourth carry-lookahead adder means includes means for detecting the all true condition of all high-order bits of the system address E exclusive of the low-order M bits, and includes a byte adder for receiving the low-order M bits of the system address E and the length number minus one equal to L, said byte adder forming a sum equal to the addition of the low-order M bits of E and of L to provide a byte adder carryout when said sum exceeds $2^M - 1$, and includes means for establishing the Z condition whenever the high-order bits of E are all true's and said byte adder provides a carryout.

10. The apparatus of claim 9 wherein said byte adder includes means for receiving L equal to five bits and M equal to 5.

11. The apparatus of claim 6 wherein each of said means for storing is responsive to clock pulses for storing data at a time not later than a first clock time, wherein said first, second, third and fourth carry-lookahead means include latch means for storing said conditions Y, X, W and Z, respectively, in response to a clock pulse at a second clock time, wherein said means for detecting includes means for storing said record PER in response to a clock pulse at a third clock time, and wherein said apparatus further includes clock distribution means for distributing clock pulses including three consecutive clock pulses defining said first, second and third clock times.

12. In a data processing system having memory and address processing circuitry, the apparatus comprising, first means for storing in response to a first clock signal a system address E used in the operation of said system, second means for storing in response to a first clock signal a lower address DTCL and third means for storing in response to a first clock signal an upper address DTCU where said lower and said upper addresses define an address event range, fourth means for storing in response to a first clock signal a length number L' representing the number of contiguous addresses, from said system address to a high address, used in the operation of said system, said length number and said system address defining an address operation range bounded by said system address and said high address, first carry-lookahead adder means, connected to receive said system address and said lower address, for providing propagate and generate signals and providing a first carryout signal if said system address is greater than or equal to said lower address, including length logic means connected to receive said propagate, generate and carryout signals and connected to receive said length number for establishing a condition Y when addresses within said operation range are within said event range, and including latch means for storing the condition Y in response to a second clock signal, second carry-lookahead adder means, connected to receive said system address and said upper address, for providing a second carryout and establishing a condition X if said system address is less than or equal to said upper address, and including latch means for storing said condition X in response to a second clock signal, third carry-lookahead adder means, connected to receive said upper address and said lower address, to establish a condition W when said lower address is greater than said upper address, and including latch means for storing said condition W in response to a second clock signal, fourth carry-lookahead adder means, connected to receive said length number L' and said system address E and including means for forming L'−1, to establish a condition Z when said system address is greater than said high address, and including latch means for storing said condition Z in response to a second clock signal, logic means, responsive to said latch means, for detecting the presence of said conditions W, X, Y, and Z to provide an event record PER when said system address is within said address event range in accordance with the equation:

PER = [(W)v(Z)]·[(X)v(Y)] v (X·Y) v (W·Z)

and including means for storing said record PER in response to a third clock signal, and clock means for distributing said first, second and third clock pulses.

13. In a data processing system having memory and address processing circuitry, the apparatus comprising, first means for storing in response to a first clock signal a system address E used in the operation of said system, second means for storing in response to a first clock signal a lower address DTCL and third means for storing in response to a first clock signal an upper address DTCU where said lower and said upper addresses define an address event range, fourth means for storing in response to a first clock signal a length number L' representing the number of contiguous addresses, from said system address to a high address, used in the operation of said system, said length number and said system address defining an address operation range bounded by said system address and said high address, first carry-lookahead adder means, having positive-true and negative-true logic byte adders connected to receive and form the difference of said system address and said lower address, for providing propagate and generate signals and providing a first carryout signal if said system address is greater than or equal to said lower address, including length logic means connected to receive said propagate, generate and carryout signals and connected to receive said length number for establishing a condition Y when addresses within said operation range are within said event range, and including latch means for storing the condition Y in response to a second clock signal, second carry-lookahead adder means, having positive-true and negative-true logic byte adders connected to receive and form the difference of said system address and said upper address, for providing a second carryout and establishing a condition X if said system address is less than or equal to said upper address, and including latch means for storing said condition X in response to a second clock signal, third carry-lookahead adder means, having positive-true and negative-true logic byte adders connected to receive and form the difference of said upper address and said lower address, to establish a condition W when said lower address is greater than said upper address, and including latch means for storing said condition W in response to a second clock signal.

fourth carry-lookahead adder means, connected to receive said length number L' and said system address E and inlcuding means for forming L'−1 equal to L where the sum E+L is formed to establish a condition Z when said system address is greater than said high address, and including latch means for storing said condition Z in response to a second clock signal, logic means, responsive to said latch means, for detecting the presence of said conditions W, X, Y, and Z to provide an event record PER when said system address is within said address event range in accordance with the equation:

PER = [(W)v(Z)]·[(X)v(Y)] v (X·Y) v (W·Z)

and including means for storing said record PER in response to a third clock signal, and clock means for distributing said first, second and third clock pulses.

* * * * *